(12) United States Patent
Barak et al.

(10) Patent No.: US 9,268,917 B1
(45) Date of Patent: Feb. 23, 2016

(54) METHOD AND SYSTEM FOR MANAGING IDENTITY CHANGES TO SHARED ACCOUNTS

(71) Applicants: Nir Barak, Karmei Yosef (IL); Miron Gross, Kfar HaOranim (IL); Amir Jerbi, Giv'atayim (IL); Ron Perlmuter, Tel Aviv (IL)

(72) Inventors: Nir Barak, Karmei Yosef (IL); Miron Gross, Kfar HaOranim (IL); Amir Jerbi, Giv'atayim (IL); Ron Perlmuter, Tel Aviv (IL)

(73) Assignee: CA, Inc., New York, NY (US)

( * ) Notice: Subject to any disclaimer, the term of this patent is extended or adjusted under 35 U.S.C. 154(b) by 174 days.

(21) Appl. No.: 14/014,669

(22) Filed: Aug. 30, 2013

(51) Int. Cl.
*G06F 21/00* (2013.01)

(52) U.S. Cl.
CPC ..................... *G06F 21/00* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,539,557 | B1* | 9/2013 | Buckner | G06F 21/31 726/4 |
| 9,069,947 | B2* | 6/2015 | Kottahachchi | G06F 21/845 |
| 9,167,047 | B1* | 10/2015 | Sharma | H04L 67/22 |
| 2011/0296001 | A1* | 12/2011 | Ramstrom | 709/224 |

OTHER PUBLICATIONS

"How can I control privileged user access across the extended enterprise," CA ControlMinder Solution Brief, CA Technologies, Inc., published 2012.

* cited by examiner

*Primary Examiner* — Beemnet Dada
(74) *Attorney, Agent, or Firm* — Baker Botts L.L.P.

(57) ABSTRACT

A method includes detecting an identity change instruction. The method also includes identifying a target account associated with the identity change instruction. The method also includes determining whether the target account is checked out. The method also includes passing the identity change instruction to a kernel in response to determining that the target account is checked out. The method also includes blocking the identity change instruction in response to determining that the target account is not checked out.

21 Claims, 8 Drawing Sheets

METHOD AND SYSTEM FOR MANAGING IDENTITY CHANGES TO SHARED ACCOUNTS

BACKGROUND

The present disclosure relates to security and, more specifically, to a method and system for managing identity changes to shared accounts.

In information technology ("IT") systems, shared accounts are typically the most important accounts. Shared accounts may include privileged accounts such as administrator accounts, superuser accounts, and other accounts with rights and privileges that may be used for system administration. Shared accounts may be exclusive (i.e., only one user or a limited number of users can access the shared account at any given time) or not exclusive (i.e., an unlimited or large number of users can access the shared account at the same time). Existing systems may provide users with permission to access and use a shared account with a password for that shared account. To provide security for the shared account, this password may be modified periodically.

In certain existing systems, a server may manage and control access to shared accounts. A user may be required to log or sign into the server to view a list of shared accounts that the user has authorization to access. Upon viewing the list of shared accounts, the user may check out a particular shared account in the list by selecting that particular shared account. The server then may provide a password for the particular shared account to the user. The user then may use the provided password to access the particular shared account. Once the user is done using the particular shared account, the user may then check in the particular shared account on the server.

In sophisticated cases, when a user checks out a particular account from the server, the server may issue a one-time password for the particular shared account. The user then may use this one-time password to access the particular shared account. After the user checks in the particular shared account, the one-time password then is modified to a randomly generated password, not known to the user. If that same user or another user with authorization to access the account checks out the particular shared account, the server would issue a new one-time password to the user or other user. By issuing a new one-time password each time a shared account is checked out, the server may provide an added level of security to the shared account.

However, in existing systems, users may be able to access a shared account by first logging into another account (e.g., an individual account) and then using a command to switch to a shared account. Such commands may be referred to as "identity change instructions." When a user uses an identity change instruction to switch to a shared account, the user may be able to bypass the security measures of the server that manages and controls access to that shared account. In fact, that server may not even be aware that a user is using the shared account. Accordingly, such situations pose security issues for enterprises that want to prevent or block unauthorized access to a shared account.

BRIEF SUMMARY

According to an aspect of the present disclosure, a method may comprise detecting an identity change instruction. The method may also comprise identifying a target account associated with the identity change instruction. The method may also comprise determining whether the target account is checked out. The method may also comprise passing the identity change instruction to a kernel in response to determining that the target account is checked out. The method may also comprise blocking the identity change instruction in response to determining that the target account is not checked out.

Other objects, features, and advantages will be apparent to persons of ordinary skill in the art from the following detailed description and the accompanying drawings.

BRIEF DESCRIPTION OF THE DRAWINGS

Aspects of the present disclosure are illustrated by way of example and are not limited by the accompanying figures with like references indicating like elements.

DETAILED DESCRIPTION

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or in a combined software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would comprise the following: a portable computer diskette, a hard disk, a random access memory ("RAM"), a read-only memory ("ROM"), an erasable programmable read-only memory ("EPROM" or Flash memory), an appropriate optical fiber with a repeater, a portable compact disc read-only memory ("CD-ROM"), an optical storage device, a magnetic storage device, or any suitable combination of the foregoing. In the context of this document, a computer readable storage medium may be any tangible medium able to contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take a variety of forms comprising, but not limited to, electro-magnetic, optical, or a suitable combination thereof. A computer readable signal medium may be a computer readable medium that is not a computer readable storage medium and that is able to communicate, propagate, or transport a program for use by or in connection with an instruction execution system, apparatus, or device. Program code embodied on a computer readable signal medium may be transmitted using an appropriate medium, comprising but not limited to wireless, wireline, optical fiber cable, RF, etc., or any suitable combination of the foregoing.

Computer program code for carrying out operations for aspects of the present disclosure may be written in a combination of one or more programming languages, comprising an object oriented programming language such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider) or in a cloud computing environment or offered as a service such as a Software as a Service ("SaaS").

Aspects of the present disclosure are described herein with reference to flowchart illustrations and/or block diagrams of methods, apparatuses (e.g., systems), and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that, when executed, may direct a computer, other programmable data processing apparatus, or other devices to function in a particular manner, such that the instructions, when stored in the computer readable medium, produce an article of manufacture comprising instructions which, when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses, or other devices to produce a computer implemented process, such that the instructions which execute on the computer or other programmable apparatus provide processes for implementing the functions/acts specified in the flowchart and/or block diagram block or blocks.

While certain example systems and methods disclosed herein may be described with reference to security, security management, and identity and access management, systems and methods disclosed herein may also be related to areas related to clouds and cloud computing (e.g., cloud data management, cloud architecture, cloud IT service and asset management, cloud mainframes, cloud emerging technologies, cloud service assurance, cloud deployment, cloud virtualization), areas related to architecture (e.g., database management, data modeling and analysis, cloud architecture, cloud data management, governance, risk and compliance for IT, project, portfolio, and financial management, software engineering, and big data), areas related to general technology (e.g., application development and databases, cloud emerging technologies, cloud IT service and asset management, cloud mainframe, IT service and asset management, mainframe, middleware and common services, usability and user experience, vertical specific technology applications), areas related to service assurance (e.g., application performance management, service assurance, cloud service assurance), and areas related to virtualization (e.g., alternative software developer methods, cloud deployment, cloud virtualization, infrastructure and operations management).

Referring now to security and security management, in an enterprise IT environment, shared accounts are usually the most important accounts. Shared accounts may be privileged accounts such as administrator accounts, superuser accounts, and other accounts with rights and privileges that may be used for network, system, or server administration. Examples of shared accounts include the "root" account in Unix-like operating systems, the "Administrator" account in the Microsoft Windows operating systems, the "SYS" account in Oracle relational database management systems ("RDBMSs"), and the "sa" or server system administrator account in Microsoft SQL Server.

A shared account management ("SAM") system may be a system that manages and controls access to shared accounts. According to existing methods, a user may access a SAM system by logging or signing in with his user identifier (e.g., username) and personal authentication information (e.g., password, passcode, security token, personal identification number). After the user logs in, the SAM system may provide the user with a list of shared accounts that the user is authorized to access. The user then may check out a particular shared account from the list of shared accounts. More specifically, the user may select a particular shared account from the list of shared accounts. The SAM system then may set a one-time password for the particular shared account. Concurrently or subsequently, the SAM system may issue the one-time password to the user. The user then may use the one-time password to access the particular shared account. After the user is finished using the particular shared account, the user may check in the particular shared account. More specifically, the user may log in to the SAM system again, select the shared account, and check it back in. Upon checking in the shared account, the SAM system may randomly generate a new password for the shared account, one which is not known to the user.

In existing systems, a SAM system that manages and controls a shared account may be expected to control all access to that shared account. For example, the SAM system may be expected to be the only entry point to the shared account. However, in many existing systems, users may gain access to a shared account in other ways by bypassing a SAM system. Thus, regardless of how robust or complex of an authentication method the SAM system uses (e.g., setting and issuing one-time passwords), a user that is not authorized to access a shared account may still gain access to that shared account. For example, in certain existing systems, a user may gain access to a shared account by logging into another account (e.g., an individual account) and then switching from that other account to the shared account. In order words, a user may log into a first account and then switch or change identity to a second account, which may be a shared account. This process may be referred to as a "switch account" or "identity change."

Identity changes may occur on many IT systems. For example, in Unix-like systems, a user may use a command "su" or a similar command (e.g., a command "sesu") to switch to another account. Usually, the "su" command is used to switch to a shared account known as "root." The "root" account is a superuser or system administrator account that has all rights and privileges of the system. Thus, when a user gains access to the "root" account, the user may use the "root" account to perform any actions or make any changes to the system. In Unix-like systems, a user also may use a command "sudo" or a similar command (e.g., a command "sesudo") to run a command or program using the privileges of another account (e.g., the "root" account). In addition, in Unix-like systems, a user may run certain programs known as setuid programs with the permissions of another account. Setuid programs are ones that have an access right flag "setuid," which allows users other than the program's owner or group to run the program.

As another example of an identity change, in a Microsoft Windows operating system, a user may use a command "runas" to run tools and programs under an account other than the one that the user used to log onto the system. Moreover, in certain systems, a user that was once authorized to access a shared account may schedule a task to run at a time when he or she may no longer have access to the shared account (e.g., when the shared account has been checked back in).

Thus, these examples show that existing SAM systems may not be a single point of entry to a shared account. Specifically, in a multi-user system, a user may use a command such as "su," "sudo," and "runas" to switch from the account that the user used to log onto the system to a different account. Such commands may be referred to as "identity change requests" or "identity change instructions." The different account that the user switches to may be a shared account that is password protected by a SAM system. However, if the user performs an identity change, then that user may not need to know the password of the shared account. Moreover, once the user gains access to the shared account, the user can modify the password settings of the shared account and have full control over access to the account.

In systems and methods described herein, a switch account or identity change control agent is incorporated into a SAM system. The identity change control agent may be a security agent. The identity change control agent may intercept identity changes to a shared account. Specifically, when a user or process on a system tries to perform an identity change to a shared account, the identity change control agent may detect the identity change. The identity change control agent then may verify whether the shared account is currently checked out and available for use by retrieving information from a central server where shared accounts are being checked out from (e.g., a SAM system). When the identity change control agent determines that the account is checked out and available for use, it may allow the identity change. Alternatively, when the identity change control agent determines that the account is not checked out and available for use, it may block the identity change. Concurrently or subsequently, the identity change control agent also may send a notification about a failed identity change attempt to an owner of the shared account.

In such systems and method described herein, the identity change control agent may run on a protected network. A user may provide commands to the protected network by inputting them into a user shell. The commands may pass from the user shell to the identity change control agent. For each command, the identity change control agent may determine whether the command requests an identity change to a shared account. When the identity change control agent determines that a particular command requests an identity change to a shared account, the identity change control agent may determine whether that shared account is checked out. Specifically, the identity change control agent may be connected to a central server where shared accounts are being checked out from (e.g., a SAM system). The identity change control agent may locally cache information corresponding to the shared account on the central server, noting which shared accounts have been checked out and which are checked in. If an account is checked in, then the identity change control agent may note that the account should not be used to log onto the protected network. Thus, when the identity change control agent determines that a shared account is not checked out (e.g., the shared account is checked in), the identity change control agent may block the particular command, thereby preventing the identity change. The identity change control agent then may generate an alert to an owner of the shared account, informing the owner of the shared account that an attempt to change identity into that shared account was blocked.

Systems and methods described herein may prevent an unauthorized user from performing an identity change to a shared account. In particular, such systems and methods may prevent users from using an account that is checked in to log into a protected network. As described above, in existing systems, the password for a shared account that is checked in may be randomly set. More specifically, when a shared account is checked in, the SAM system that manages and controls access to the shared account may randomly generate a new password for the shared account. This new password may be stored on the SAM system, but it may not be known by any users. Thus, when a user tries to switch to a checked-in shared account, such systems and methods described herein may prevent the user from switching to that account. By doing so, such systems and methods ensure that a shared account will not be used unless it has been properly checked out on the SAM system.

Such systems and methods described herein also allow a network to remain accessible and available to users as long as those users do not try to switch to a checked-in shared account. Moreover, such systems and methods may be setup to allow or block automatic unattended activity that runs on behalf of a checked-in account.

Figure 1:
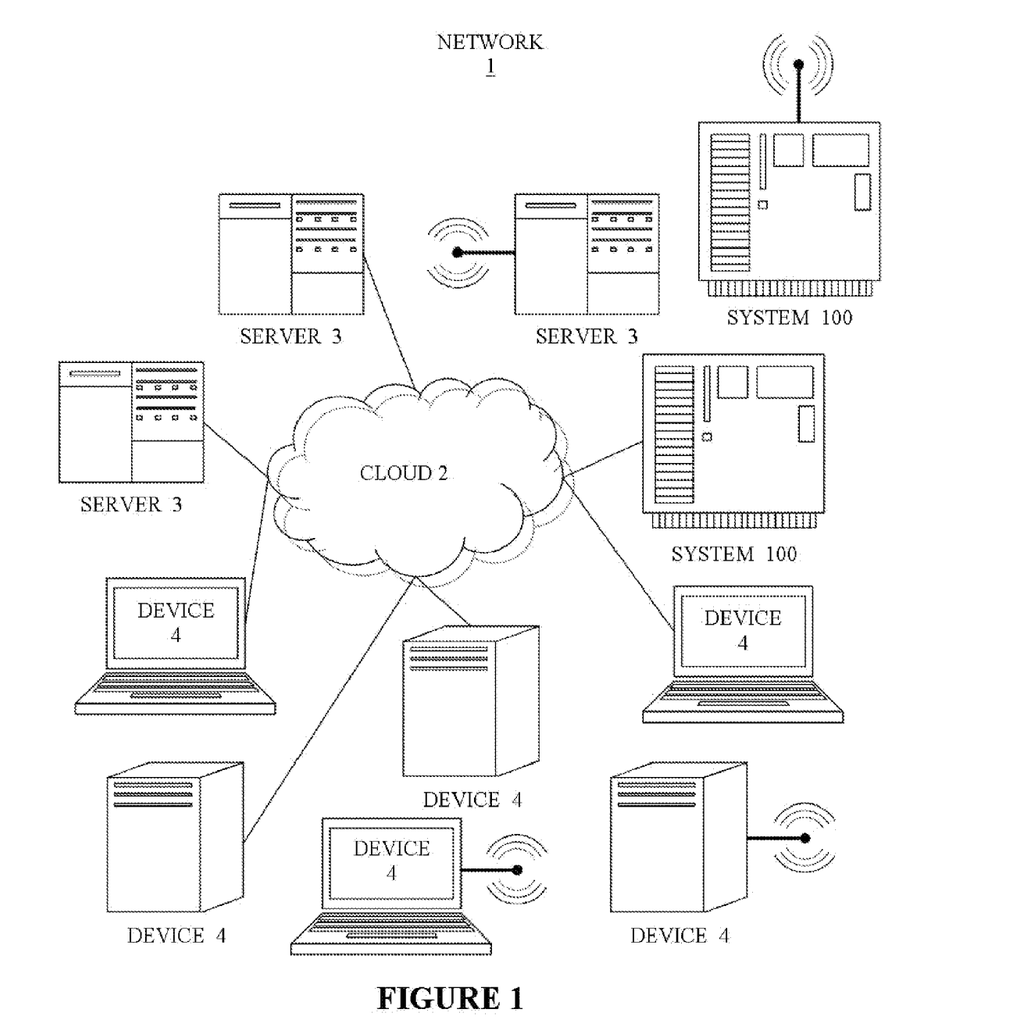
FIG. 1 is a schematic representation of an example network monitored by a device that manages identity changes to accounts.

Referring now to FIG. 1, a network 1 monitored by a device that manages identity changes to accounts now is described. Network 1 may comprise one or more clouds 2, which may be public clouds, private clouds, or community clouds. Network 1 may be a private or protected network. Each cloud 2 may permit the exchange of information and services among users that are connected to such clouds 2. In certain configurations, cloud 2 may be a wide area network, such as the Internet. In some configurations, cloud 2 may be a local area network, such as an intranet. Further, cloud 2 may be a closed, private network in certain configurations, and cloud 2 may be an open network in other configurations. Cloud 2 may facilitate wired or wireless communications of information and provisioning of services among users that are connected to cloud 2.

Network 1 may comprise one or more servers 3 and other devices operated by service providers, information providers, administrators (e.g., network administrators, system administrators, security administrators, database administrators), and other parties. Network 1 also may comprise one or more devices 4 utilized by service consumers, information consumers, and other users. Service providers and information providers may provide information and services to information consumers and service consumers utilizing the one or more servers 3, which connect to the one or more devices 4 via cloud 2. The services may comprise, for example, information technology services, cloud services, security services, access services, monitoring services, operations services, infrastructure services, and other resource-provisioning services. Servers 3 may comprise, for example, one or more of general purpose computing devices, specialized computing devices, mainframe devices, wired devices, wireless devices, monitoring devices, infrastructure devices, and other devices configured to provide one or more of services and information to information consumers and service consumers. Devices 4 may comprise, for example, one or more of general purpose computing devices, specialized computing devices, mobile devices, wired devices, wireless devices, passive devices, routers, switches, mainframe devices, monitoring devices, infrastructure devices, and other devices utilized by service consumers and information consumers. Example items may include network 1, cloud 2, servers 3, and devices 4.

Moreover, network 1 may comprise one or more systems 100. System 100 may be, for example, one or more of a general purpose computing device, a specialized computing device, a wired device, a wireless device, a mainframe device, an infrastructure device, a monitoring device, and any other device configured to collect data from one or more data sources (e.g., servers, sensors, networks, interfaces, other devices). System 100 may monitor network 1, cloud 2, servers 3, devices 4, and other devices in network 1. System 100 may collect and receive information (e.g., access information, user information, authentication information, account information, other variable information) from network 1, cloud 2, servers 3, devices 4, and other devices in network 1. By collecting and receiving this information from network 1, cloud 2, servers 3, devices 4, and other devices in network 1, system 100 may manage identity changes to a shared account. In particular, system 100 may detect an identity change instruction (e.g., a "su" command, a "sudo" command, a "runas" command), identify an account associated with the identity change instruction, and determine whether the account is checked out. Depending on whether the account is checked out, system 100 then may pass the identity change instruction to a kernel (e.g., a kernel of a native operating system) to be executed or block the identity change instruction.

In some configurations, one or more of servers 3 and devices 4 may comprise system 100. In other configurations, system 100 may be separate from servers 3 and devices 4.

Figure 2:
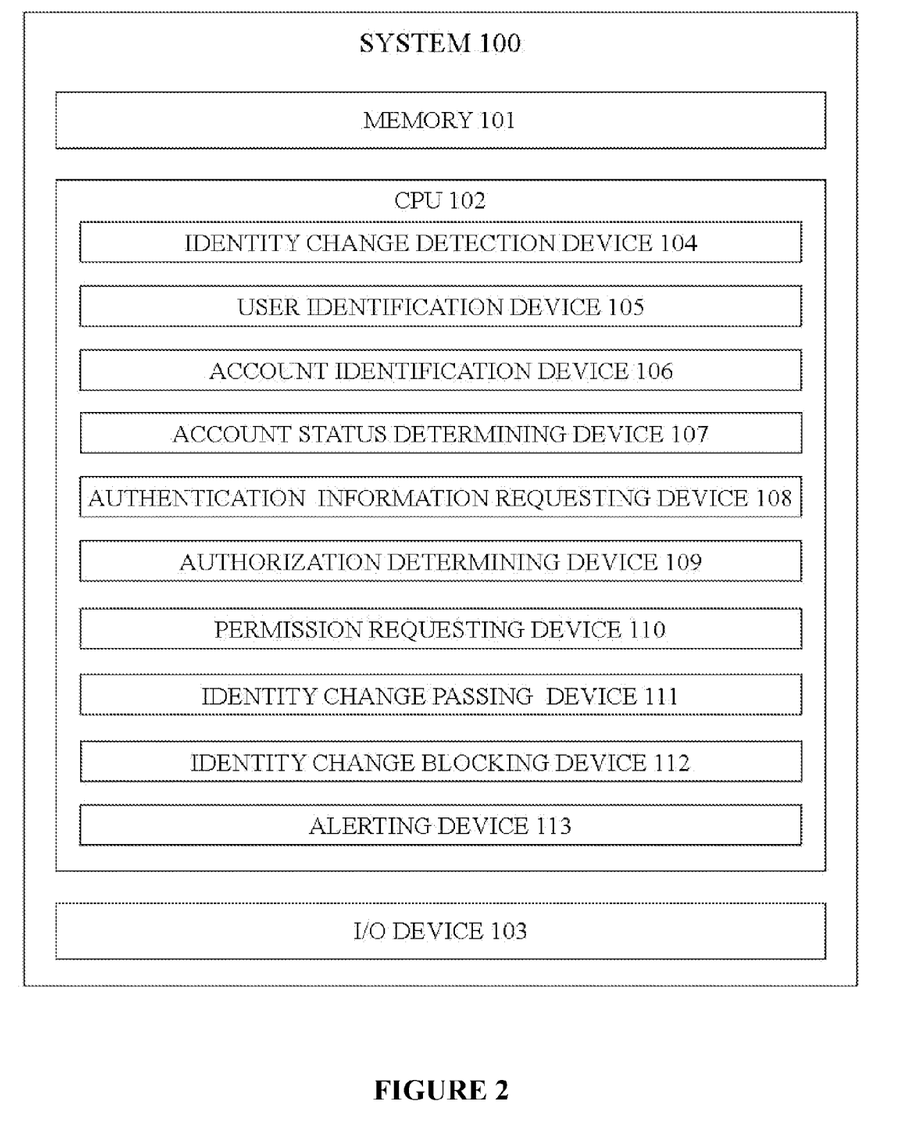
FIG. 2 is a schematic representation of an example system configured to manage identity changes to accounts.

Referring now to FIG. 2, system 100, which may manage identity changes to accounts, now is described. System 100 may comprise a memory 101, a central processing unit ("CPU") 102, and an input and output ("I/O") device 103. Memory 101 may store computer-readable instructions that may instruct system 100 to perform certain processes. In particular, when executed by CPU 102, the computer-readable instructions stored in memory 101 may instruct CPU 102 to operate as one or more of an identity change detection device 104, a user identification device 105, an account identification device 106, an account status determining device 107, an authentication information requesting device 108, an authorization determining device 109, a permission requesting device 110, an identity change passing device 111, an identity change blocking device 112, and an alerting device 113.

In particular configurations, one or more of identity change detection device 104, user identification device 105, account identification device 106, account status determining device 107, authentication information requesting device 108, authorization determining device 109, permission requesting device 110, identity change passing device 111, identity change blocking device 112, and alerting device 113 may be implemented on one or more different CPUs, which may be located on remote or local devices.

I/O device 103 may receive one or more of data from cloud 2, data from other devices and sensors connected to system 100, and input from a user and provide such information to CPU 102. I/O device 103 may transmit data to cloud 2, may transmit data to other devices connected to system 100, and may transmit a notification to a user (e.g., display a message, make a sound, send an email, make a telephone call). Further, I/O device 103 may implement one or more of wireless and wired communications between system 100 and other devices.

Figure 3:
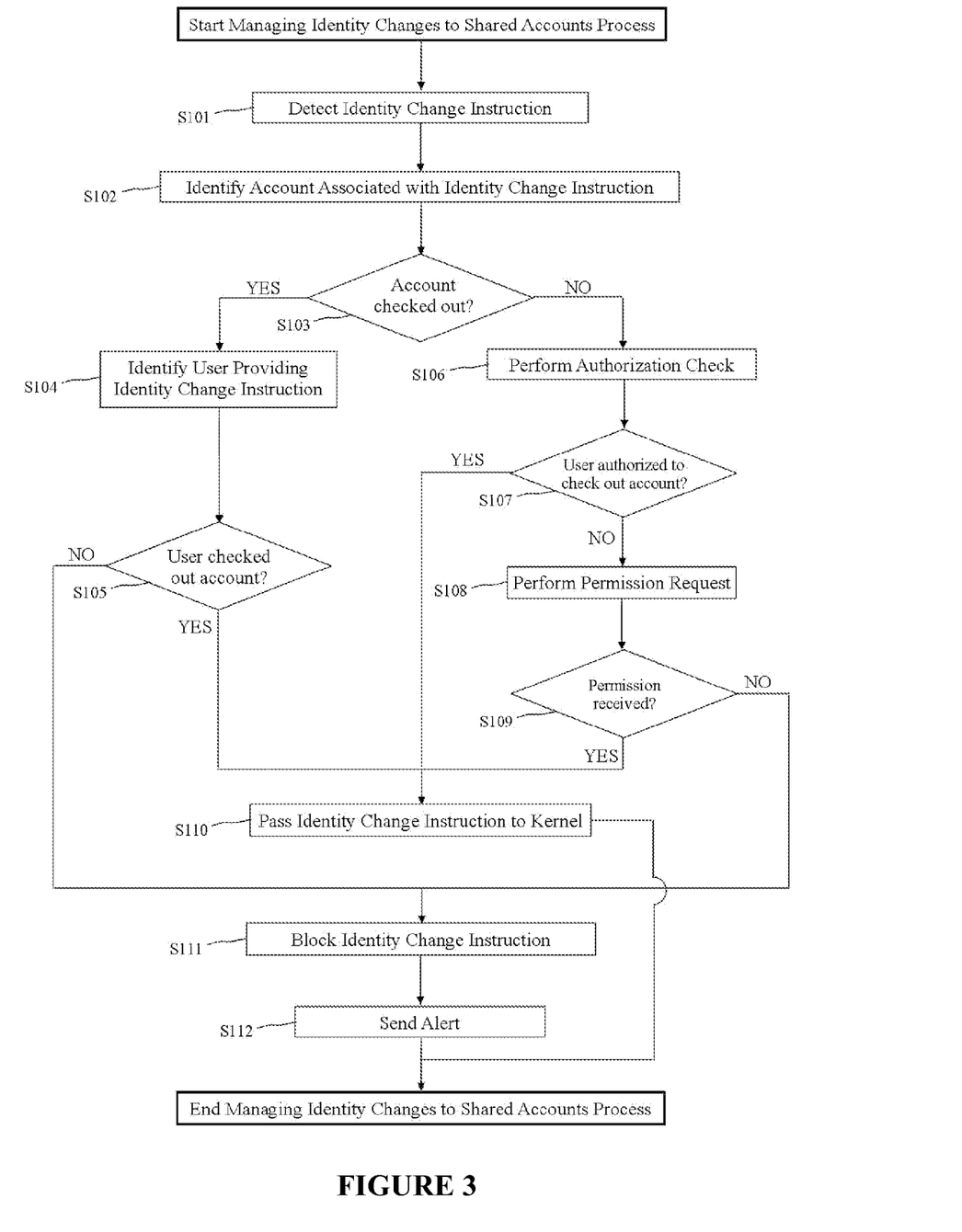
FIG. 3 illustrates a process of detecting an identity change instruction, determining whether an account associated with the identity change instruction is checked out, and passing the identity change instruction to a kernel in response to determining that the account is checked out.
Figure 4:
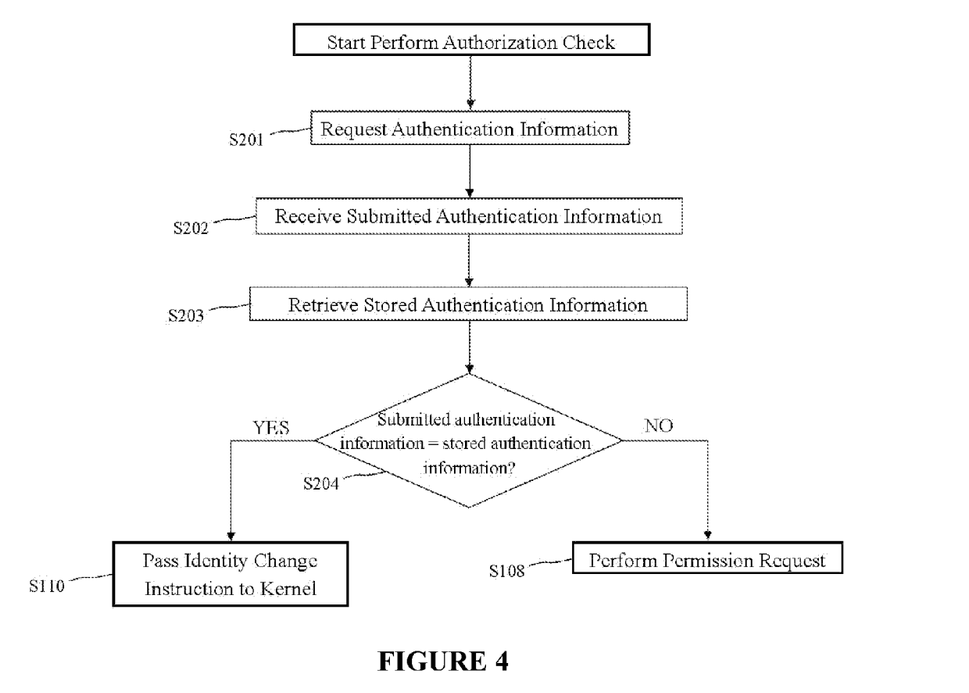
FIG. 4 illustrates a process of performing an authorization check.
Figure 5:
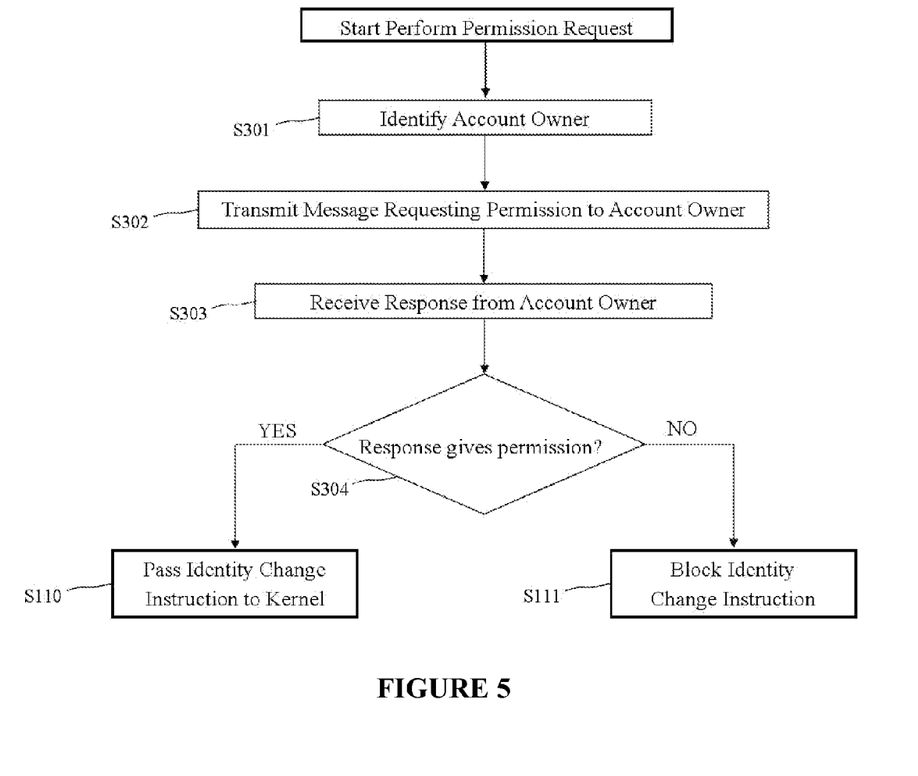
FIG. 5 illustrates a process of performing a permission request.

Referring now to FIGS. 3-5, example processes performed by identity change detection device 104, user identification device 105, account identification device 106, account status determining device 107, authentication information requesting device 108, authorization determining device 109, permission requesting device 110, identity change passing device 111, identity change blocking device 112, and alerting device 113 now are described. FIG. 3 depicts a process of detecting an identity change instruction, determining whether an account associated with the identity change instruction is checked out, and passing the identity change instruction to a kernel in response to determining that the account is checked out. A user may log into a private or protected network using a first account. That private or protected network may be network 1, as depicted in FIG. 1. The first account may be a client account (e.g., an individual user account, a personal account).

The user may then provide data and instructions to the protected network using a user interface (e.g., a user shell). The user interface may be located on or connected to a computer system (e.g., workstation). In FIG. 1, this computer system may correspond to, for example, a device 4 or other device in network 1. The data and instructions provided by the user may pass (e.g., be sent or transmitted) from the user interface to system 100.

In S101, identity change detection device 104 may detect an identity change instruction. In particular, identity change detection device 104 may monitor (e.g., examine, analyze) the data and instructions provided by the user and identify any identity change instructions. Identity change instructions may comprise instructions to switch to a second account or instructions to perform an action using one or more privileges of a second account. The second account may be a shared account. The second account may be known as a "target account" (e.g., an account identified or targeted by an identity change instruction). A shared account may be an account that is shared by one or more users or clients. In other words, a shared account is typically not associated with a particular user. Rather, a shared account may be accessed by a group of users. Shared accounts may be non-exclusive or exclusive accounts. When a shared account is an exclusive account, only one user (or a limited number of users) is allowed to use the shared account at one time. When a shared account is a non-exclusive account, any number of users are allowed to use the account at one time. Examples of shared accounts include administrator or supervisor accounts (e.g., the "root" account in Unix-like operating systems, the "Administrator" account in Microsoft Windows operating systems, the "SYS" account in Oracle database management systems).

Typically, shared accounts may have more rights and privileges than individual user accounts. Thus, when a user wants to perform an action (e.g., run a file, execute a command) but the user's individual user account does not have sufficient privileges, then the user may use an identity change instruction to switch to a shared account with elevated privileges. For example, in a Unix-like operating system, a user may use the identity change instruction "su" to switch to the administrator account "root." After switching to the shared account, the user may then perform the action. Alternatively, instead of using an identity change instruction to switch to another account, a user may use an identity change instruction to perform the action as another user. In particular, the user may use the identity change instruction to perform the action with the elevated privileges of a shared account. For example, in a Unix-like operating system, a user may use the identity change instruction "sudo" to execute a command using the privileges of the administrator account "root." As another example, in a Microsoft Windows operating system, a user may use the identity change instruction "runas" to run a file as the administrator account "Administrator."

In FIG. 3, when identity change detection device 104 detects an identity change instruction, the process may proceed to S102. In S102, account identification device 105 may identify the second account (e.g., the account associated with the identity change instruction). As described above, the second account may be a shared account. Then, in S103, account status determining device 107 may determine whether the second account is checked out. Under existing methods, a user may access a shared account by logging into a SAM system (e.g., a system that manages and controls access to shared accounts) and checking out the shared account. Specifically, a user may check out a shared account by selecting that shared account and performing a check out process. A check out process may be, for example, pressing a button marked "Check Out," checking a box marked "Check Out," or double clicking on an icon that corresponds to the shared account. After the user has indicated that he or she is checking out the account, the SAM system may issue a one-time password to the user. The user then may use the one-time password to access the shared account.

Accordingly, in order to determine whether the second account is checked out, account status determining device 107 may reference account information stored on a SAM system. The account information may comprise, for example, a list of accounts and their status (e.g., checked in, checked out, inactive) or a list of accounts that have been checked out. Alternatively, account status determining device 107 may transmit a message to the SAM system, requesting account information on the second account. Then, after receiving the account information on the second account, account status determining device 107 may determine whether the second account is checked out.

When account status determining device 107 determines that the second account is checked out (S103: YES), the process may proceed to S104. In S104, user identification device 105 may identify the user providing the identity change instruction. Specifically, user identification device 105 may identify the user by referring to information that the user provided to log into the protected network (e.g., login input). That information may comprise, for example, a user identifier (e.g., username, user or personal identification number). Then, in S105, user identification device 105 may determine whether the user checked out the second account. Similar to S103 (described above), in order to determine whether the user checked out the second account, user identification device 105 may reference account information that is stored on the SAM system. Alternatively, user identification device 105 may transmit a message to the SAM system, requesting the account information. The account information may comprise, for example, a list of users that have checked out the second account. Then, by determining whether the user is on the list of users, user identification device 105 may determine whether the user checked out the second account.

When user identification device 105 determines that the user checked out the second account (S105: YES), the process may proceed to S110. In S110, identity change passing device 111 may pass the identity change instruction to a kernel in response to determining that the user checked out the second account. More specifically, identity change passing device 111 may instruct I/O device 103 to pass the identity change instruction to the kernel. The kernel may be a component of the computer system. The kernel may interface with a processor (e.g., a CPU of a device). For example, the kernel may serve as a bridge between system 100 and a CPU of the computer system to which the user interface is connected. After receiving the identity change instruction, the kernel may pass the identity change instruction to the processor. The processor then may execute the identity change instruction, thereby allowing the user to switch to the second account or perform an action using one or more privileges of the second account. Subsequently, the process may terminate.

In certain configurations, passing the identity change instruction to the kernel may comprise passing the identity change instruction to the user interface. The user interface may be configured to pass the identity change instruction to the kernel. Thus, upon receiving the identity change instruction, the user interface may pass the identity change instruction to the kernel.

Alternatively, when user identification device 105 determines that the user did not check out the second account (S105: NO), the process may proceed to S111. In S111, identity change blocking device 112 may block the identity change instruction. Blocking the identity change instruction may comprise not passing the identity change instruction to the kernel to be executed. Blocking the identity change instruction may also comprise intercepting and deleting the identity change instruction before the identity change instruction is executed by the processor. Thus, the user may be prevented from switching to the second account or performing an action using one or more privileges of the second account. In S112, alerting device 113 may then send (e.g., transmit) an alert to an owner of the second account. In particular, alerting device 113 may refer to information stored locally (e.g., information stored within system 100) or remotely (e.g., information stored on another server) to determine the identity of the owner of the second account. Alerting device 113 then may direct I/O device 103 to transmit the alert to the owner of the second account. The alert may be a message informing the owner of the second account that an identity change instruction provided by a user was blocked (e.g., that a user was prevented from switching to the second account, that a user was prevented from performing an action using one or more privileges of the second account). The alert may comprise at least a name corresponding to the user providing the identity change request and a time that the user is providing the identity change request. The owner of the second account may be an administrator (e.g., a network administrator, a system administrator, a security administrator, a database administrator) or other managing entity responsible for the second account. For example, within an enterprise, the owner of a shared account may be a head or principal engineer, an IT manager, or other supervisory employee. Upon receiving the alert, the owner of the second account may take action based on whether the user is authorized to access the second account. For example, if the owner of the second account determines that the user is an unauthorized user, then the owner of the second account may track down the user and inquire as to the user's reasons for attempting to access the second account. The process then may terminate.

In certain configurations, there may be more than one owner of the second account. In such configurations, when alerting device 113 determines the identities of the owners of the second account, alerting device 113 may direct I/O device 103 to transmit the alert to each of the owners of the second account.

Returning to S103, when account status determining device 107 determines that the second account is not checked out (e.g., the second account is checked in), the process may proceed to S106. In S106 and S107, authentication information requesting device 108 and authorization determining device 109 may perform an authorization check. Specifically, authentication information requesting device 108 may retrieve authentication information. Retrieving the authentication information may comprise, for example, requesting and receiving the authentication information from the user. Alternatively, retrieving the authentication information may comprise obtaining the authentication information from a stored location (e.g., a server 3, device 4, or other device in network 1). For instance, when the user logged into the protected network via the computer system, the computer system may have stored the user's login input, which includes authentication information corresponding to the client account. Thus, authentication information requesting device may obtain that authentication information from the computer system. The authentication information may comprise a password, a passcode, a passphrase, or other secret key.

Authorization determining device 109 may receive the authentication information and determine whether the user is authorized to access the second account using the authentication information. When authorization determining device 109 determines that the user is authorized to access the second account (S107: YES), the process may proceed to S110 and identity change passing device 111 may pass the identity change instruction to the kernel. When authorization determining device 109 determines that the user is not authorized to access the second account (S107: NO), the process may proceed to S108. FIG. 4, described below, provides a more detailed view of S106 and S107.

In S108, permission requesting device 110 may perform a permission request. Specifically, permission requesting device 110 may request permission or approval for the user to access the second account from an owner of the second account. Then, in S109, when permission requesting device 110 receives permission to access the second account (S109: YES), the process may proceed to S110 and identity change passing device 111 may pass the identity change instruction to the kernel. When permission requesting device 110 does not receive permission to access the second account (S109: NO), then the process may proceed to S111 and identity change blocking device 112 may block the identity change instruction.

In certain configurations, alerting device 113 may also send an alert to the owner of the second account when permission requesting device 110 does not receive permission to access the second account. The owner of the second account may then take appropriate action to address the unauthorized attempt to access the second account. In particular configurations, prior to performing the permission request, system 100 may send a message to the user to inform the user that permission for the user to access the second account will be sought from an owner of the second account. Upon receiving that message, the user may choose to not get permission from an owner of the second account. The process may then proceed to S111 (block identity change instruction) and S112 (send alert). FIG. 5, described below, provides a more detailed view of S108 and S109.

As described above, in certain configurations, there may be more than one owner of the second account. In such configurations, permission requesting device 110 may request permission for the user to access the second account from each of the owners of the second account. When permission requesting device 110 receives permission to access the second account from one of the owners of the second account (S109: YES), the process may proceed to S110.

In certain configurations, S104 and S105 may be omitted. Accordingly, in such configurations, when account status determining device 107 determines that the second account is checked out (S103: YES), the process may proceed directly to S110 and identity change passing device 111 may pass the identity change instruction to the kernel. In other words, in such configurations, identity change passing device 111 may pass the identity change instruction to the kernel in response to determining that the second account is checked out. In some configurations, S106-S109 may be omitted. Accordingly, in such configurations, when account status determining device 107 determines that the second account is not checked out (S103: NO), the process may proceed directly to S111 and identity change blocking device 112 may block the identity change instruction. In other words, in such configurations, identity change blocking device 112 may block the identity change instruction in response to determining that the second account is not checked out.

In particular configurations, S106/S107 may be performed after S108/S109. Accordingly, in such configurations, when account status determining device 107 determines that the second account is not checked out (S103: NO), the process may proceed to S108 and permission requesting device 110 may perform the permission request (e.g., request permission to access the second account from an owner of the second account). When permission requesting device 110 receives permission to access the second account (S109: YES), the process may proceed to S110 and identity change passing device 111 may pass the identity change instruction to the kernel. When permission requesting device 110 does not receive permission to access the second account (S109: NO), the process may proceed to S106 and authentication information requesting device 109 and authorization determining device 109 may perform the authorization check (e.g., requesting and receiving authentication information and determining whether the user is authorized to access the second account using the authentication information). Then, in S107, when authorization determining device 109 determines that the user is authorized to access the second account (S107:

YES), the process may proceed to S110 and identity change passing device 111 may pass the identity change instruction to the kernel. And, when authorization determining device 109 determines that the user is not authorized to access the second account (S107: NO), the process may proceed to S111 and identity change blocking device 112 may block the identity change instruction. In other configurations, S106/S107 may be performed concurrently with S108/S109. In such configurations, when permission requesting device 110 receives permission to access the second account (S109: YES) or authorization determining device 109 determines that the user is authorized to access the second account (S107: YES), the process may proceed to S110 and identity change passing device 111 may pass the identity change instruction to the kernel. And, when permission requesting device 110 does not receive permission to access the second account (S109: NO) and when authorization determining device 109 determines that the user is not authorized to access the second account (S107: NO), the process may proceed to S111 and identity change blocking device 112 may block the identity change instruction. Alternatively, in such configurations, the process may proceed to S110 and identity change passing device 111 only when permission requesting device 110 receives permission to access the second account (S109: YES) and authorization determining device 109 determines that the user is authorized to access the second account (S107: YES). Thus, when permission requesting device 110 does not receive permission to access the second account (S109: NO) or when authorization determining device 109 determines that the user is not authorized to access the second account (S107: NO), the process may proceed to S111 and identity change blocking device 112 may block the identity change instruction. In still other configurations, S106 and S107 may be omitted. Accordingly, when account status determining device 107 determines that the second account is not checked out (S103: NO), the process may proceed to S108 and permission requesting device 110 may perform the permission request. When permission requesting device 110 receives permission to access the second account (S109: YES), the process may proceed to S110 and identity change passing device 111 may pass the identity change instruction to the kernel. When permission requesting device 110 does not receive permission to access the second account (S109: NO), the process may proceed to S111 and identity change blocking device 112 may block the identity change instruction. In yet other configurations, S108 and S109 may be omitted. Accordingly, when authorization determining device 109 determines that the user is not authorized to access the second account (S107: NO), the process may proceed directly to S111 and identity change blocking device 112 may block the identity change instruction.

In some configurations, when authorization determining device 109 determines that the user is authorized to access the second account (S107: YES), the process may proceed to S108 and permission requesting device 110 may perform the permission request. In other configurations, S112 may be omitted.

Referring now to FIG. 4, which provides an example view of S106 and S107, authentication information requesting device 108 and authorization determining device 109 may perform an authorization check. In S201, authentication information requesting device 108 may request authentication information from the user. As described above, the authentication information may comprise a password, a passcode, or a passphrase. Requesting the authentication information may comprise prompting the user for the authentication information. More specifically, authentication information requesting device 108 may generate a script (e.g., a program, an instruction), which, when executed by a computer, prompts the user for the authentication information. For example, authentication information requesting device 108 may direct I/O device 103 to transmit the script to the computer system to which the user interface is connected. After the computer system receives the script, the CPU of the computer system may execute the script, causing the user interface to prompt the user for the authentication information. In certain configurations, additional authentication information may not be requested. Such configurations may involve cases where the user wants to run a setuid command or program that is owned by the second account. As described above, a setuid command may be a command that has an access right flag "setuid" that allows users other than the command file's owner or group to run the command. Thus, if the user has been given permission to run a setuid command, then the user may automatically gain the privileges of the second account (e.g., an account that owns the setuid command) and be allowed to run the setuid command.

The user may obtain the authentication from a stored location. Alternatively, the user may already have possession or knowledge of the authentication information. The user may provide the authentication information to system 100. The authentication information that is provided by the user may be referred to as "submitted authentication information." The submitted authentication information may be user authentication information (e.g., a user identity or authentication information associated with the user) or authentication information specific to the second account. When the submitted authentication information is user authentication information, authentication information associated with the second account may be kept secret.

In S202, authentication information requesting device 108 may receive the submitted authentication information. Specifically, I/O device 103 may receive the submitted authentication information and pass the submitted authentication information to authentication information requesting device 108. In S203-S205, authorization determining device 109 may determine whether the user is authorized to access the second account using the submitted authentication information. In particular, in S203, authorization determining device 109 may retrieve stored authentication information. The stored authentication information may be stored on system 100, the SAM system, or other device in network 1. Then, in S204, authorization determining device 109 may determine whether the submitted authentication information matches the stored authentication information. When authorization determining device 109 determines that the submitted authentication information matches the stored authentication information (S204: YES), the process may proceed to S110, described above. When authorization determining device 109 determines that the submitted authentication information does not match the stored authentication information (S204: NO), the process may proceed to S108, described above.

To provide an example of this process, assume that a user A has authorization to access a shared account. After providing an identity change instruction in attempt to switch to the shared account, user A may be prompted for authentication information. User A may obtain the authentication information by logging into the SAM system. In particular, user A may log into the SAM system, check out the shared account, and receive a one-time password for accessing the shared account. User A then may submit the one-time password as the authentication information. Upon receiving the one-time password, system 100 may retrieve stored authentication information. More specifically, authorization determining device 109 may request stored authentication information from the SAM system. The SAM system may provide the one-time password that it had issued to user A. System 100, acting as authorization determining device 109 then may determine whether the submitted authentication information (e.g., the one-time password submitted by user A) matches the stored authentication information (e.g., the one-time password retrieved from the SAM system). When the submitted authentication information matches the stored authentication information (S204: YES), the process may proceed to S110, and identity change passing device 11 may pass user A's identity change instruction to the kernel to be executed.

To provide another example of this process, assume that a user B also has authorization to access a shared account. In a first database, an owner of the shared account may list user B as a user that has authorization to access the shared account. Like user A, user B may provide an identity change instruction in attempt to switch to the shared account. System 100 may detect the identity change instruction and determine that user B is listed as a user that has authorization to access the shared account. Specifically, authorization determining device 109 may refer to the first database and determine that user B is listed as an authorized user. System 100 may then prompt user B for authentication information. User B may submit a personal password as the authentication information to system 100. Upon receiving user B's personal password, system 100 may retrieve stored authentication information for user B from a second database (e.g., a password management database). System 100 may use the stored authentication information to verify user B's identity. More specifically, system 100 may compare the authentication information submitted by user B (e.g., user B's personal password) to the authentication information stored in the second database. When the submitted authentication information matches the stored authentication information (S204: YES), the process may proceed to S110, and identity change passing device 11 may pass user B's identity change instruction to the kernel to be executed.

Referring now to FIG. 5, which provides an example view of S108 and S109, permission requesting device 110 may request permission for the user to access the second account from an owner of the second account. Specifically, in S301, permission requesting device 110 may identity an owner of the second account. In particular, permission requesting device 110 may refer to information stored locally (e.g., information stored within system 100) or remotely (e.g., information stored on another server) to determine the identity of the owner of the second account. For example, permission requesting device 110 may refer to information stored on the SAM system to determine the identity of the owner of the second account.

Then, in S302, permission requesting device 110 may transmit a message requesting permission for the user to access the second account to the owner of the second account. The message may comprise a request for the permission and a user identifier corresponding to the user. After receiving the message, the owner of the second account may determine whether to give the permission. When the owner of the second account determines to give the permission, he or she may transmit a response to system 100, in which the response comprises a grant of permission for the user to access the second account. When the owner of the second account determines to not give the permission, he or she may transmit a response to system 100, in which the response comprises a denial of permission for the user to access the second account. In S303, permission requesting device 110 may receive the response from the owner of the second account. More specifically, I/O device 103 may receive the response from the owner of the second account and pass the response to CPU 102.

In S304, permission requesting device 110 may determine whether it received the permission. In particular, when the response comprises a grant of permission for the user to access the second account, permission requesting device 110 may determine that it received the permission. Alternatively, when the response comprises a denial of permission for the user to access the second account, permission requesting device 110 may determine that it did not receive the permission. When permission requesting device 110 determines that it received the permission (S304: YES), the process may proceed to S110, described above. When permission requesting device 110 determines that it did not receive the permission (S304: NO), the process may proceed to S111, described above.

As noted above, in certain configurations, there may be more than one owner of the second account. In such configurations, permission requesting device 110 may transmit a message requesting permission for the user to access the second account to each of the owners of the second account. When a response from any of the owners of the second account comprises a grant of permission for the user to access the second account, permission requesting device 110 may determine that it received the permission for the user to access the second account.

Figure 6:
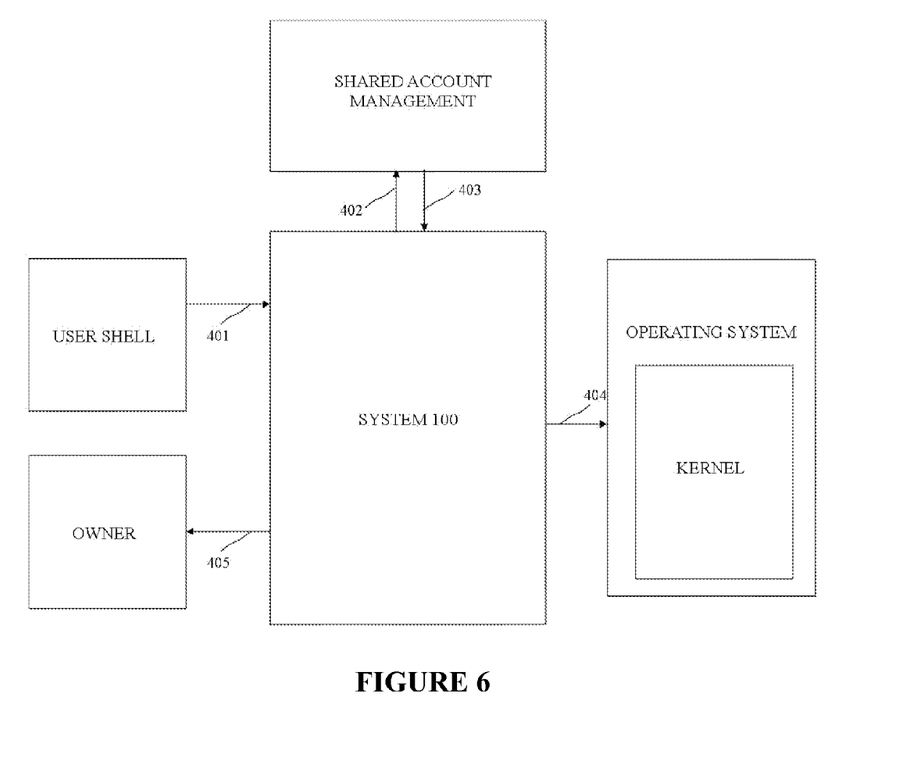
FIG. 6 depicts a block diagram of an example configuration for managing identity changes to shared accounts.
Figure 7:
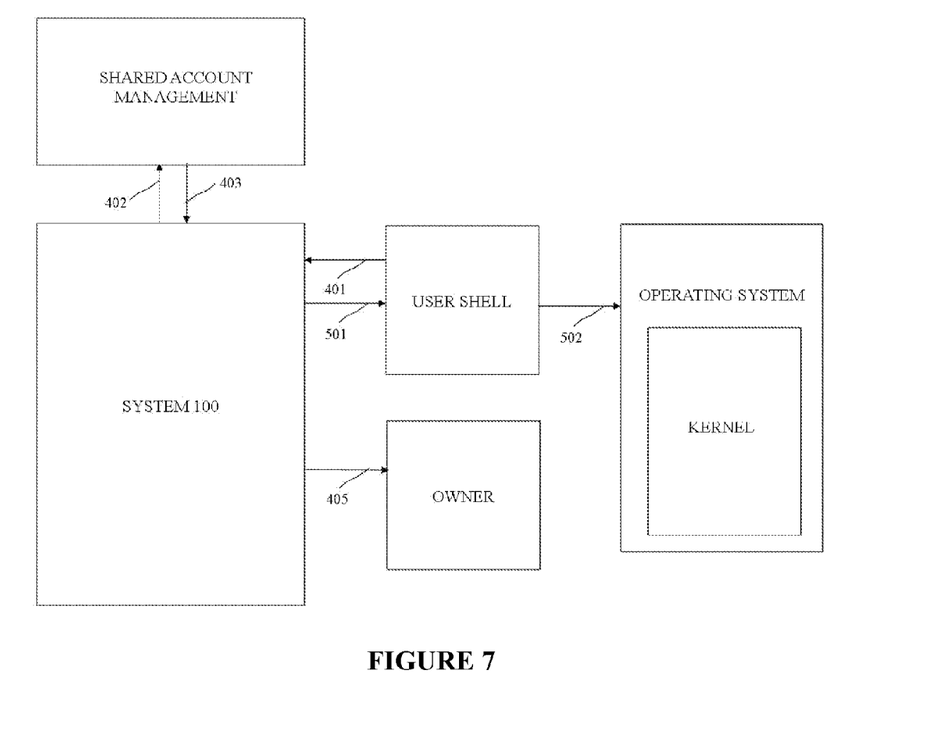
FIG. 7 depicts a block diagram of another example configuration for managing identity changes to shared accounts.
Figure 8:
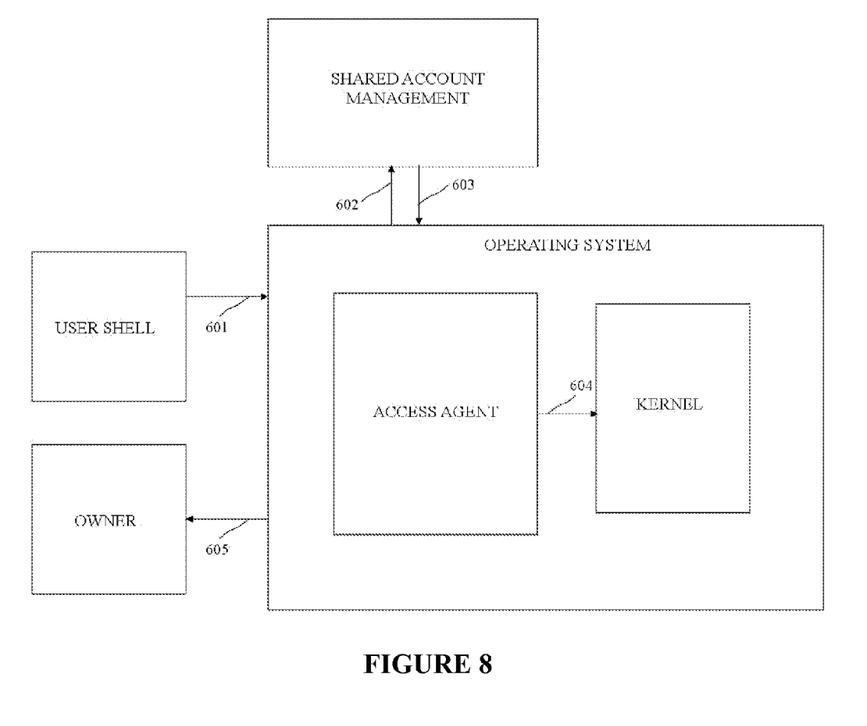
FIG. 8 depicts a block diagram of yet another example configuration for managing identity changes to shared accounts.

Referring now to FIGS. 6-8, example configurations for managing identity changes to shared accounts now are described. FIG. 6 depicts a block diagram of a first example configuration for managing identity changes to shared accounts. This first example configuration may exist in a network 1, as depicted in FIG. 1, having a system 100, servers 3, and devices 4. In FIG. 6, a user may be logged into an operating system using a user account. The operating system may reside on a computer system (e.g., a device 3 in network 1). The user may want to switch to a shared account using an identity change instruction (e.g., the "su" command). The user may input the identity change instruction into a user shell connected to the computer system with a CPU. The identity change instruction may pass from the user shell to system 100. Signal 401 may represent the identity change instruction.

System 100 may detect the identity change instruction. System 100 may identify the shared account (e.g., the account associated with the identity change instruction). System 100 then may determine whether the account is checked out. Specifically, system 100 may transmit a message to a SAM system, requesting account information such as, for example, a list of shared accounts that are checked out. Signal 402 may represent this message. The SAM system may be a server 4 in network 1. After receiving the message, the SAM system may transmit the account information via signal 403 to system 100. System 100 then may determine whether the shared account is on the list of shared accounts that are checked out.

When system 100 determines that the shared account is on the list (e.g., when system 100 determines that the shared account is checked out), system 100 may pass the identity change instruction via signal 404 to the operating system. In certain configurations described above, system 100 may also verify whether the user is the user that checked out the shared account or a user who is authorized to check out the shared account prior to passing the identity change instruction to the operating system. A kernel of the operating system may receive the identity change instruction and pass the identity change instruction to a processor (not depicted) to be executed (e.g., the CPU of the computer system). The processor then may execute the identity change instruction, thereby allowing the user to switch to the shared account. Alternatively, when system 100 determines that the shared account is not on the list (e.g., when system 100 determines that the shared account is not checked out), system 100 may block the identity change instruction (e.g., not pass the identity change instruction to the operating system). System 100 also may send (e.g., transmit) an alert via signal 405 to an owner of the shared account. System 100 further may transmit a warning message to the user. The warning message may indicate to the user that the identity change instruction was not executed. Alternatively, system 100 may transmit to a processor (e.g., the CPU of the computer system) a command to communicate the warning message to the user. The command, when executed by the processor, may cause the warning message to be communicated (e.g., displayed, played audibly) to the user.

FIG. 7 depicts a block diagram of a second example configuration for managing identity changes to shared accounts. This second example configuration may also exist in a network 1, as depicted in FIG. 1. FIG. 7 is similar to FIG. 6 in all respects except that, in response to determining that shared account is checked out, system 100 may pass the identity change instruction to the user shell via signal 501. The identity change instruction then may pass from the user shell to the kernel of the operating system via signal 502. The kernel then may pass the identity change instruction to a processor (not depicted) to be executed.

FIG. 8 depicts a block diagram of a third example configuration for managing identity changes to shared accounts. This third example configuration may also exist in a network 1, as depicted in FIG. 1. In FIG. 8, an access agent may be an extension of the kernel of the operating system. The access agent may comprise computer-readable instructions that may instruct a processor (not depicted) connected to the operating system to perform certain processes. The processor may be CPU 102 of system 100 or another processor connected to the operating system. In particular, when executed by the processor, the computer-readable instructions may instruct the processor to operate as one or more of identity change detection device 104, user identification device 105, account identification device 106, account status determining device 107, authentication information requesting device 108, authorization determining device 109, permission requesting device 110, identity change passing device 111, identity change blocking device 112, and alerting device 113.

Similar to FIGS. 6 and 7, in FIG. 8, a user may attempt to switch to a shared account using an identity change instruction. The user may input that identity change instruction into the user shell. The identity change instruction may pass from the user shell to the operating system via signal 501. The processor (e.g., CPU 102 of system 100) may receive the identity change instruction and, operating as identity change detection device 104, detect the identity change instruction. The processor then may determine whether the shared account is checked out. In particular, the processor, operating as account status determining device 107, may transmit a message requesting account information to a SAM system. Signal 602 may represent this message. The SAM system then may provide the account information to the processor via signal 603. When the processor determines that the shared account has been checked out, the processor, acting as identity change passing device 111, may pass the identity change instruction to a kernel to be executed. When the processor determines that the shared account has not been checked out, the processor, operating as identity change blocking device 112, may block the identity change instruction by not passing the identity change instruction to the kernel to be executed. The processor, operating as alerting device 113, may also send an alert via signal 505 to the owner of the account or a warning message to the user.

The flowcharts and diagrams in FIGS. 1-8 illustrate the architecture, functionality, and operation of possible implementations of systems, methods, and computer program products according to various aspects of the present disclosure. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a," "an," and "the" are intended to comprise the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of means or step plus function elements in the claims below are intended to comprise any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. For example, this disclosure comprises possible combinations of the various elements and features disclosed herein, and the particular elements and features presented in the claims and disclosed above may be combined with each other in other ways within the scope of the application, such that the application should be recognized as also directed to other embodiments comprising other possible combinations. The aspects of the disclosure herein were chosen and described in order to best explain the principles of the disclosure and the practical application and to enable others of ordinary skill in the art to understand the disclosure with various modifications as are suited to the particular use contemplated.

What is claimed is:
1. A method comprising:
  detecting, using a processor, an identity change instruction, the identity change instruction instructing a system to change a user's identity from a first identity to a second identity;
  identifying a target account associated with the identity change instruction;

determining, using the processor, whether the target account is checked out;
in response to determining that the target account is checked out:
passing the identity change instruction from the system to a kernel of an operating system to be executed; and
changing the user's identity from the first identity to the second identity; and
in response to determining that the target account is not checked out, blocking the identity change instruction.

2. The method of claim 1, wherein changing the user's identity from the first identity to the second identity comprises passing the identity change instruction to a user interface, the user interface configured to pass the identity change instruction to a kernel.

3. The method of claim 1, wherein instructing the system to change the user's identity from the first identity to the second identity comprises at least one of:
an instruction to switch to the target account, and an instruction to perform an action using one or more privileges of the target account,
wherein the target account comprises a shared account.

4. The method of claim 1, further comprising, in response to determining that the target account is checked out:
identifying a user providing the identity change instruction; and
determining whether the user checked out the target account,
wherein changing the user's identity from the first identity to the second identity comprises passing the identity change instruction to a kernel in response to determining that the user checked out the target account.

5. The method of claim 1, further comprising, in response to determining that the target account is not checked out:
retrieving authentication information;
determining whether the user is authorized to access the target account using the authentication information;
wherein changing the user's identity from the first identity to the second identity comprises passing the identity change instruction to a kernel in response to determining that the user is authorized to access the target account.

6. The method of claim 1, further comprising, in response to determining that the target account is not checked out:
requesting permission to access the account from an owner of the target account; and
receiving the permission to access the target account,
wherein changing the user's identity from the first identity to the second identity comprises passing the identity change instruction to a kernel in response to receiving the permission to access the target account.

7. The method of claim 1, further comprising, in response to determining that the target account is not checked out, sending an alert to an owner of the target account, the alert comprising at least one of:
a name corresponding to a user providing the identity change instruction; and
a time that the user is providing the identity change instruction.

8. A system comprising:
a detecting device configured to detect an identity change instruction, the identity change instruction instructing the system to change a user's identity from a first identity to a second identity;
an account identifying device configured to identify a target account associated with the identity change instruction;
a first determining device configured to determine whether the target account is checked out;
a passing device configured to, in response to determining that the target account is checked out, pass the identity change instruction from the system to a kernel of an operating system to be executed;
a changing device configured to, in response to determining that the target account is checked out, change the user's identity from the first identity to the second identity; and
a blocking device configured to block the identity change instruction in response to determining that the target account is not checked out.

9. The system according to claim 8, wherein the passing device is configured to pass the identity change instruction to a user interface, the user interface configured to pass the identity change instruction to the kernel.

10. The system of claim 8, wherein the identity change instruction comprises at least one of: an instruction to switch to the target account, and an instruction to perform an action using one or more privileges of the target account,
wherein the target account comprises a shared account.

11. The system of claim 8, further comprising:
an user identifying device configured to identify a user providing the identity change instruction in response to determining that the target account is checked out;
a second determining device configured to determine whether the user checked out the target account;
wherein the passing device is configured to pass the identity change instruction to the kernel in response to determining that the user checked out the target account.

12. The system of claim 8, further comprising:
a retrieving device configured to retrieve authentication information in response to determining that the target account is not checked out;
a third determining device configured to determine whether the user is authorized to access the target account using the authentication information;
wherein the passing device is configured to pass the identity change instruction to the kernel in response to determining that the user is authorized to access the target account.

13. The system of claim 8, further comprising:
a requesting device configured to request permission to access the target account from an owner of the target account in response to determining that the target account is not checked out; and
a permission receiving device configured to receive the permission to access the target account,
wherein the passing device is configured to pass the identity change instruction to the kernel in response to receiving the permission to access the target account.

14. The system of claim 8, further comprising:
a sending device configured to send an alert to an owner of the target account, the alert comprising at least one of:
a name corresponding to a user providing the identity change request; and
a time that the user is providing the identity change request.

15. A computer program product comprising:
a non-transitory computer readable storage medium having computer readable program code embodied therewith, the computer readable program code comprising:
computer readable program code configured to detect an identity change instruction, the identity change instruction instructing a system to change a user's identity from a first identity to a second identity;

computer readable program code configured to identify a target account associated with the identity change instruction;

computer readable program code configured to determine whether the target account is checked out;

computer readable program code configured to, in response to determining that the target account is checked out:
- pass the identity change instruction from the system to a kernel of an operating system to be executed; and
- change the user's identity from the first identity to the second identity; and computer readable program code configured to block the identity change instruction in response to determining that the target account is not checked out.

16. The computer program product according to claim 15, wherein the computer readable program code configured to pass the identity change instruction to a kernel comprises computer readable program code configured to pass the identity change instruction to a user interface, the user interface configured to pass the identity change instruction to the kernel.

17. The computer program product according to claim 15, wherein the identity change instruction comprises at least one of: an instruction to switch to the target account, and an instruction to perform an action using one or more privileges of the target account,
wherein the target account comprises a shared account.

18. The computer program product according to claim 15, further comprising:
computer readable program code configured to identify a user providing the identity change instruction in response to determining that the target account is checked out;
computer readable program code configured to determine whether the user checked out the target account;
wherein the computer readable program code configured to pass the identity change instruction to a kernel comprises computer readable program code configured to pass the identity change instruction to a kernel in response to determining that the user checked out the target account.

19. The computer program product according to claim 15, further comprising:
computer readable program code configured to retrieve authentication information in response to determining that the target account is not checked out;
computer readable program code configured to determine whether the user is authorized to access the target account using the authentication information,
wherein the computer readable program code configured to pass the identity change instruction to a kernel comprises computer readable program code configured to pass the identity change instruction to a kernel in response to determining that the user is authorized to access the target account.

20. The computer program product according to claim 15, further comprising:
computer readable program code configured to request permission to access the target account from an owner of the target account in response to determining that the target account is not checked out; and
computer readable program code configured to receive the permission to access the target account,
wherein the computer readable program code configured to pass the identity change instruction to a kernel comprises computer readable program code configured to pass the identity change instruction to a kernel in response to receiving the permission to access the target account.

21. The computer program product according to claim 15, further comprising:
computer readable program code configured to send an alert to an owner of the target account, the alert comprising at least one of:
a name corresponding to a user providing the identity change request; and
a time that the user is providing the identity change request.

* * * * *